Sept. 29, 1959
L. A. RUNTON
2,906,573
SELF-LUBRICATING BEARING
Filed March 18, 1957
Fig. 1.
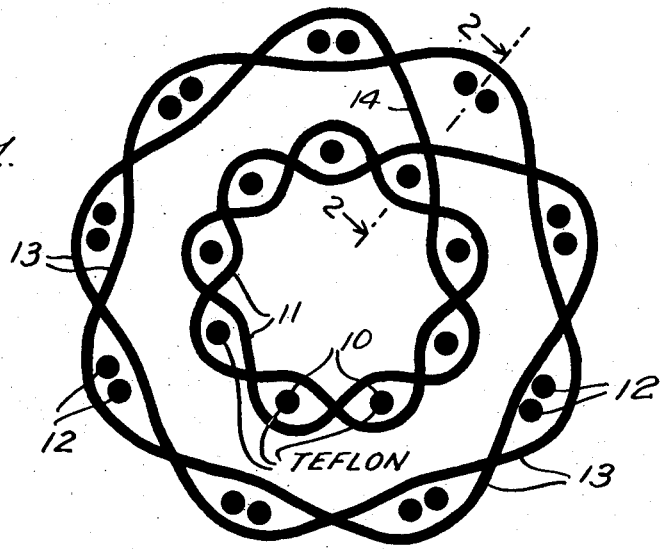
Fig. 2.
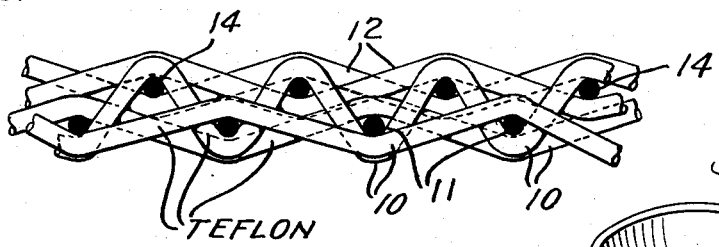
Fig. 3.
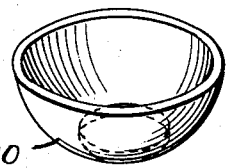
Fig. 5.
Fig. 4.
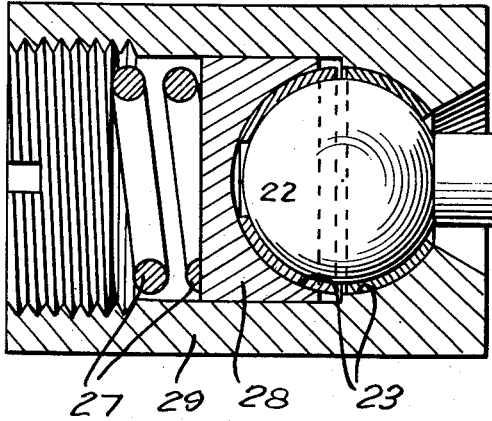
INVENTOR
LESLIE A. RUNTON
BY
*H. J. Leek*
ATTORNEY

2,906,573

SELF-LUBRICATING BEARING

Leslie A. Runton, Middle Haddam, Conn., assignor to The Russell Manufacturing Company, Middletown, Conn., a corporation of Connecticut Application March 18, 1957, Serial No. 646,911

2 Claims. (Cl. 308—238)

This invention relates to bearings and has for an object to provide a self-lubricating bearing having novel and improved characteristics.

In the automotive and aviation fields, there are many areas where bearings are required which need no lubrication and which will stand high temperatures. The knuckle joints in the steering mechanism of an automobile can have bearing cups shaped like the ball joint they serve with a wall thickness of one-eighth inch, and which are composed of laminated impregnated Bakelite resin fabrics, pressed in molds and cured to a given thickness and hardness. These cups have heretofore been manufactured by taking a bandage-type or strip-type of impregnated textile material which is wrapped around a mandrel and then placed in a mold for final shaping, curing, pressing, etc.

These cups are then sprayed with or dipped in a hot Teflon liquid which forms a thin coating on the outside of the object. Teflon is an excellent anti-friction material because of its low adhesion qualities and low coefficient of friction. However, this in turn prevents it from making a good bond onto the plastic backing material.

These bearings are tubular in nature or spherical with a hole at the top of the sphere. However, the spheres are in two halves and therefore can be made from a tubular woven cone.

This invention relates to the method of manufacture of such bearings wherein the Teflon is in the form of a monofilament yarn woven into the face of a background material which is suitable for the impregnation of Bakelite resins, and so woven as to conform to the final shape of the bearing itself.

The woven material in tubular form has an inside lining of Teflon monofilament attached to and interlaced with an outside case of cotton or synthetic fiber which will be impregnated with resins. A straight tube is woven for parallel circular bearings, and through the use of a fan-shaped moving reed on the lay of the loom, the threads are changed in position so that a cone is formed, or a sleeve having a varying diameter. These cones are cut off at the apex and base and inserted into the molds which form the spherical bearings for the knuckle joint in the steering mechanism of automobiles.

In the support of vibrating equipment in aircraft, some rotating and some stationary, dampening supports capable of withstanding high temperatures are required.

By taking this same weave with Teflon on the inside and Dacron or other suitable high temperature synthetic on the outside, bonded to high temperature silicone rubbers, bushings which will stand high temperatures and allow a certain amount of movement or "float" through the introduction of the Teflon are formed.

Due to the expansion and contraction of hot metal parts, this frictionless movement through a high-temperature bushing is an essential requirement; also movement due to vibration is prevented from chafing the bearing.

The nature of the invention will be better understood by referring to the following description, taken in connection with the accompanying drawing in which a specific embodiment has been set forth for purposes of illustration.

In the drawing:

Fig. 1 is an expanded transverse section through a tubular bearing illustrating the weave;

Fig. 2 is a section taken on the line 2—2 of Fig. 1;

Fig. 3 is a perspective view of a spherical bearing embodying the invention;

Fig. 4 is a similar perspective view of a bearing in cylindrical form, and

Fig. 5 is a detail view of a steering knuckle embodying the bearings of Fig. 3.

Referring to the drawing more in detail the bearing is shown in Fig. 1 as woven in tubular form in two plies. The inner ply is woven with warp yarns 10 of Teflon and chain yarns 11 of cotton or synthetic material such as nylon, rayon or Dacron. The outer ply consists of warp yarns 12 of cotton or synthetic material and with chain yarns 13 which may be woven as crossovers 14 which bind the two plies together. Other binder yarns (not shown) may also be used to bind the plies together at various points.

The tubular fabric thus formed has Teflon yarns 10 exposed on the inner surface and mechanically bound into a woven fabric of cotton or synthetic yarns which can be impregnated and bound to a metal surface.

The tubular fabric is impregnated with a suitable resin such as Bakelite and is formed under heat and pressure into the desired form such as the spherical form 20 of Fig. 3 or the cylindrical form 21 of Fig. 4. The fabric may be woven in conical form if desired for making the spherical bearing of Fig. 3.

The bearings 20 of Fig. 3 are used as shown in Fig. 5 between an inner spherical member 22 and outer spherical surfaces 23 forming parts of a steering knuckle of an automobile or the like. The inner spherical member 22 carries a pin 25 to be connected to an external part and a member 26 pressed by a spring 27 secures the parts in place. The bearings may be cemented to the outer members 28 and 29.

The Teflon surface which has a low coefficient of friction provides a permanent anti-friction surface without lubrication.

Of course the Teflon surface may be woven on the outside instead of on the inside if an outer anti-friction surface is desired.

If the chains 11 and 13 and the warps 12 are composed of Dacron the bearing will be resistant to high temperatures.

What is claimed is:

1. In a ball and socket joint, a socket member having an inner ball receiving surface and a molded fabric bearing member secured to said surface, said bearing member comprising a two-ply fabric woven in tubular form, one of said plies forming a bearing surface and the other of said plies forming a bonding surface, each of said plies being comprised of warp yarns and chain yarns, the chain yarns of the two plies crossing at intervals between said plies to bind said plies together, the warp yarns of the plies forming the bearing surface comprising Teflon yarns and being mechanically bound by the chain yarns, and the warp yarns of the ply forming the bonding surface and the chain yarns of both plies being composed of a resin bondable yarn, and a bonding resin bonding the warp yarns and the chain yarns of the ply forming the bonding surface to said socket surface with said Teflon warp yarns comprising the bearing surface for said ball.

2. A bearing member as set forth in claim 1 wherein the yarns other than the Teflon yarns are composed of Dacron whereby the bearing member is resistant to high temperatures.

References Cited in the file of this patent
UNITED STATES PATENTS

| | | |
|---|---|---|
| 2,681,223 | Walters | June 15, 1954 |
| 2,804,886 | White | Sept. 3, 1957 |

OTHER REFERENCES

The Wall Street Journal, May 11, 1956, page 2.